United States Patent [19]

Dothan

[11] Patent Number: 4,612,477
[45] Date of Patent: Sep. 16, 1986

[54] TRIGGERING DEVICE FOR A VACUUM ARC IN A PLASMA CENTRIFUGE

[75] Inventor: Felix Dothan, Jerusalem, Israel

[73] Assignee: Yale University, New Haven, Conn.

[21] Appl. No.: 564,532

[22] Filed: Dec. 22, 1983

[51] Int. Cl.[4] .............................................. H01J 7/24
[52] U.S. Cl. ............................ 315/111.21; 315/111.81; 328/67; 328/74
[58] Field of Search .................. 315/111.21, 111.81; 328/64, 67, 74, 78; 250/423, 426

[56] References Cited

U.S. PATENT DOCUMENTS

| | | | |
|---|---|---|---|
| 3,071,710 | 1/1963 | Fischer et al. | 328/67 |
| 3,809,896 | 5/1974 | Schuy et al. | 250/426 |
| 4,092,559 | 5/1978 | Dashuk | 328/67 |
| 4,275,317 | 6/1981 | Frosch et al. | 328/67 |
| 4,458,180 | 7/1984 | Sohval | 315/111.81 |

OTHER PUBLICATIONS

"Plasma Centrifuge", by Krishnan et al, Physical Review Letters, vol. 46, No. 1, Jan. 5/81, pp. 36–38.

*Primary Examiner*—Harold Dixon
*Attorney, Agent, or Firm*—Armstrong, Nikaido, Marmelstein & Kubovcik

[57] ABSTRACT

The present invention is directed to an apparatus for producing a vacuum arc in a plasma centrifuge. The apparatus comprises a cathode of a material from which the vacuum arc is formed and a trigger electrode. A trigger circuit is coupled to the trigger electrode for storing energy and then applying a break down voltage between the cathode and the trigger electrode where the cathode breaks down and initiates the vacuum arc. A pulse forming circuit is electrically coupled to the cathode for supplying a constant current pulse to the cathode to enhance the formation of a completely ionized plasma. The resistance of the pulse forming network is lower than the impedance of the vacuum arc. The present invention also in directed to an anode grid holder for use in the plasma centrifuge.

11 Claims, 11 Drawing Figures

| Actual values | 1 | 2 | 3 | 4 | 5 |
|---|---|---|---|---|---|
| (mF) C | 47 | 38 | 39 | 46 | 65 |
| (μH) L | 5.3 | 6.5 | 7.5 | 11.0 | 20.0 |
| (mΩ) R | Less than 10 Milliohms | | | | |

Z = 85 milliohms

TRIGGERING DEVICE FOR A VACUUM ARC IN A PLASMA CENTRIFUGE

This invention was made with government support under Contract N00014-800-0075. The government has certain rights in this invention.

BACKGROUND OF THE INVENTION

1. Field of the Invention

The present invention is directed to an apparatus for storing energy and subsequently transferring it to a vacuum arc such as used for supplying plasma to a plasma centrifuge. The apparatus incorporates an electrical circuit including a pulse forming network which is matched to the vacuum arc thereby providing an energy storage and arc initiating apparatus which is reliable, energy efficient, simple and of a relatively small physical size.

2. Description of the Prior Art

In plasma centrifuges of the type used for mass separation such as that described in *Hirshfield et al,* "Plasma Centrifuge" *Physical Review Letters,* Volume 46, No. 1, Jan. 5, 1981, the vacuum arc is triggered by a short focused laser pulse. The laser produced plasma initiates the discharge of a high voltage capacitor bank and a vacuum arc is formed. The energy efficiency is, however, very low because most of the stored energy is dissipated as heat in a series ballast resistor. This low efficiency of energy transfer has proven to be a decided disadvantage in the use of such a technique. Furthermore, the arc current is not constant during the pulse and the use of a laser for arc initiation necessitates an expensive, complex and not very reliable apparatus.

Another technique considered in supplying current to the vacuum arc is the use of a pulse forming network such as a Guillemin five section network of unequal lumped elements. In a Guillemin network, the elements (capacitors and inductors) are designed in such a way that a quasi-rectangular current pulse of duration $\tau$ is delivered into an ohmic load Z. The rise and fall of the current are linear, the rise time and fall time each being about 8% of $\tau$. If the total resistance R of the network is of the same order of magnitude as the load impedance or larger, the current pulse becomes severly distorted. This situation occurred in prior art devices where the Guillemin pulse forming network was discharged into the extremely low impedance of the vacuum arc which is typically 40-80 milliohms because the inductors of the network were not designed to have a resistance much lower than the arc impedance.

SUMMARY OF THE INVENTION

It is the primary object of the present invention to provide an apparatus for supplying energy to a vacuum arc in a plasma centrifuge which includes a pulse forming network that delivers an approximately constant current pulse to the vacuum arc and a triggering circuit suitable for initiating the vacuum arc.

It is another object of the present invention to provide such an apparatus which is energy efficient in that most of the energy supplied to the apparatus is applied to the vacuum arc.

It is still another object of the present invention to provide a pulse forming network having a total ohmic resistance which is much smaller than that of the load.

It is a further object of the present invention to provide an apparatus which requires a relatively low charging voltage thereby providing an apparatus which is simple and compact.

It is still another object of the present invention to provide a cathode holder for holding the cathode of a plasma centrifuge incorporating an auxiliary electrode for triggering the vacuum arc.

It is still a further object of the preesnt invention to provide a holder for an anode grid used in a plasma centrifuge.

The present invention is directed to an apparatus for producing a vacuum arc in a plasma centrifuge. The apparatus comprises a cathode of a material from which the vacuum arc is formed and a trigger electrode. A trigger circuit is coupled to the trigger electrode for storing energy and then applying a breakdown voltage between the cathode and the trigger electrode so that the cathode breaks down and initiates the vacuum arc. A pulse forming network is electrically coupled to the cathode for supplying a constant current pulse to the vacuum arc to enhance the formation of a completely ionized gas and reduce the formation of droplets and/or neutral gas. The resistance of the pulse forming network is lower than the impedance of the vacuum arc.

A further feature of the present invention is directed to an anode grid holder which ensures mechanical stability and good electrical contact to ground. A ring member is provided which makes contact with the inner wall of the vessel of the plasma centrifuge and the grid anode is bolted to the ring. Tightening of the bolt holding the grid deforms the ring in such a way that the diameter of the contact portion increases and the edges thereof bite into the inner wall of the vessel.

DETAILED DESCRIPTION OF THE PREFERRED EMBODIMENT

Figure 1:
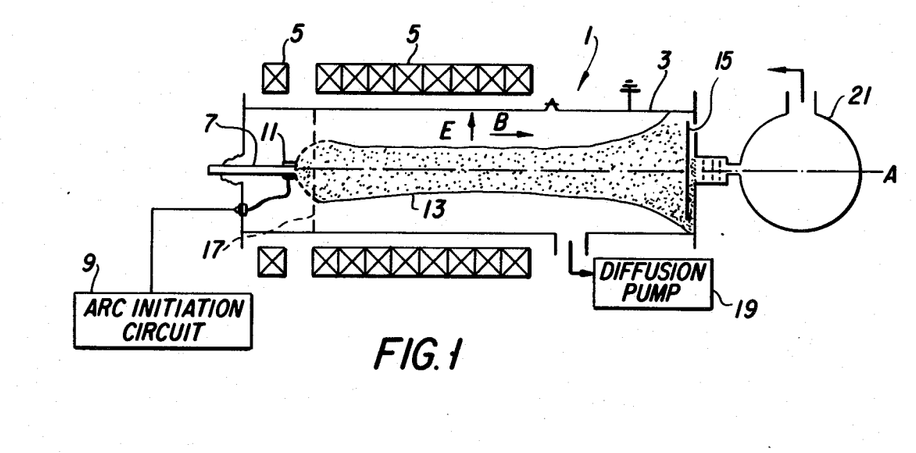
FIG. 1 is a plasma centrifuge of the type with which the present invention is used.

Referring to FIG. 1, a plasma centrifuge generally indicated at 1, comprises a vessel 3 surrounded by electromagnetic coils 5. The cathode 7 is positioned in the vessel 3 and is connected to an arc circuit 9 by means of trigger electrode 11. The vacuum arc plasma 13, which is initiated by a pulse applied to the cathode 7 through the trigger electrode 11 rotates about axis A as a result of the magnetic field B of the electromagnetic coils 5 and the electric field E of the plasma, and flows towards collector 15. An anode grid 17 at ground potential may be used in order to provide stabilization of the plasma arc should that be necessary. A vacuum is created in the vessel 3 by means of diffusion pumps 19 and 21.

Figure 2:
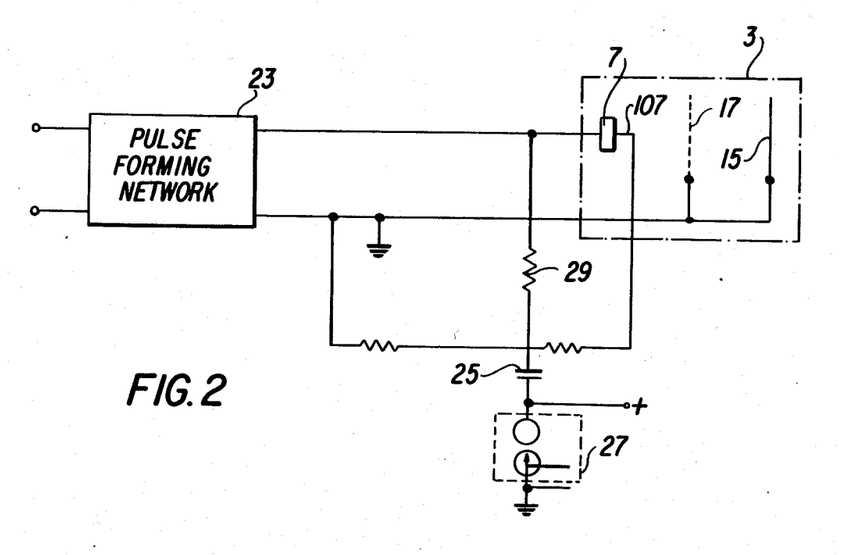
FIG. 2 is a schematic diagram of an arc initiation and triggering circuit of the present invention.

FIG. 2 shows an embodiment of the arc circuit 9. This circuit comprisess a pulse forming network 23 which is connected to the cathode 7. Capacitor 25 is charged to a high positive potential with respect to ground. At predetermined time intervals, a triggered spark gap circuit 27 (or other switching means (not shown)) is switched, capacitor 25 reverses polarity and a high negative potential is applied to the cathode 10 which causes a breakdown across the gap between the cathode and the trigger electrode. This voltage breakdown results in the initiation of a vacuum arc which creates the plasma that rotates within the plasma centrifuge. Resistor 29 is important in that without this resistor, the pulse forming network will not discharge in spite of the break down between the cathode and the electrode. The reason for this is that without resistor 29, during the trigger pulse, the cathode 7 remains at a negative potential higher than that of the pulse forming network preventing the flow of current from the pulse forming network.

Figure 3:
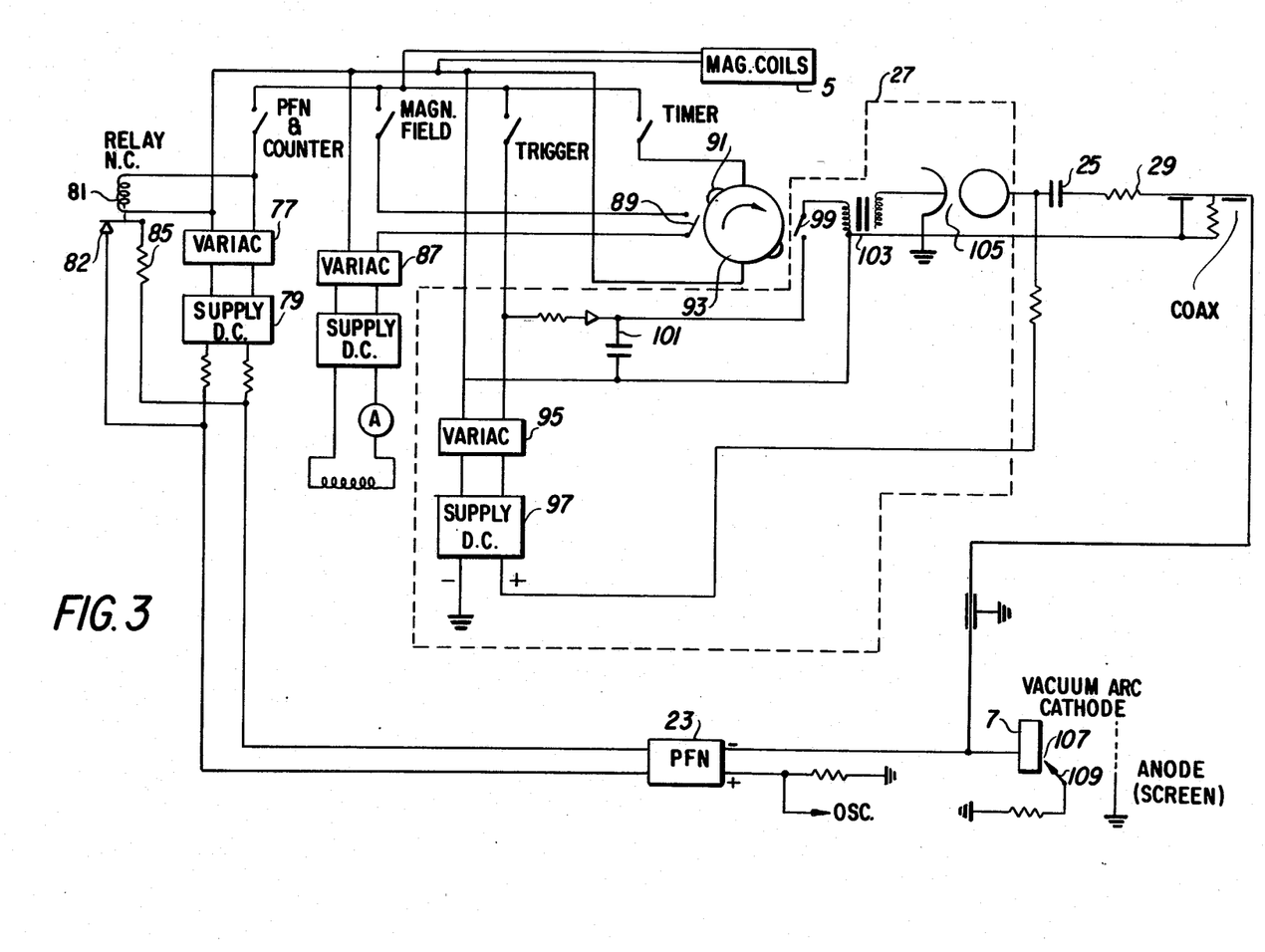
FIG. 3 is a more detailed schematic diagram of an embodiment of FIG. 2.

FIG. 3 is a more detailed schematic circuit diagram of the arc circuit shown in FIG. 2. Referring to FIG. 3, the pulse forming network 23 is charged by means of a transformer 77 and rectifier 79. When the power to the pulse forming network 23 is cut off, the coil 81 of a normally closed relay is deenergized and switch 83 is closed thereby providing a discharge path for the pulse forming network 23 through a bleeding resistor 85. The magnetic coils 5, which supply the magnetic field for the plasma centrifuge, receive power from a transformer 87. The field current is periodically applied by the closing of a microswitch 89, which is closed by a cam 91 on a cam wheel 93, rotated by a synchronous motor (not shown).

The trigger circuit 27 includes a high voltage supply comprising a transformer 95 and a rectifier unit 97. The rectified voltage from the rectifier unit 97 charges the capacitor 25 and at the same time, cam switch 99 is closed by the rotation of the cam wheel 93, Each time the microswitch 99 is closed, capacitor 101 is discharged into the primary of pulse transformer 103. The secondary of the transformer 103 is connected to the trigger electrode of a triggered spark gap 105, which has one terminal connected to capacitor 25, which was previously charged to a high positive potential. Since the capacitor cannot discharge immediately, its terminal, which was at ground potential jumps to a high negative potential, thereby placing a high negative potential on the cathode 7 of the vacuum arc. Subsequently, the capacitor 25 discharges through the gap 107 between the vacuum arc cathode 7 and the trigger electrode 109, producing a spark which initiates the vacuum arc. The pulse forming network then discharges into the vacuum arc to form the plasma of a completely ionized gas.

Figure 4A:
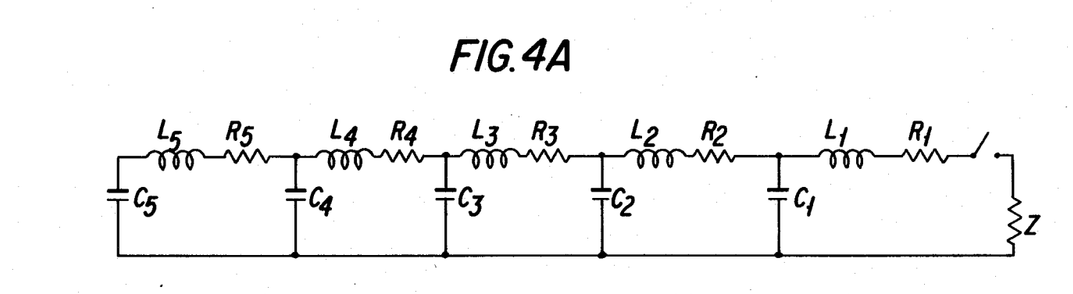
FIG. 4A is a schematic circuit diagram of the pulse forming network of the present invention.
Figure 4B:
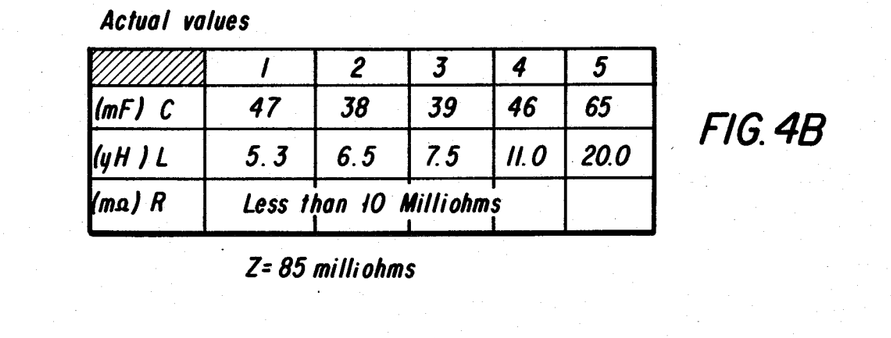
FIG. 4B is a table showing an exemplary set of values for the pulse forming network shown in FIG. 4A.

FIG. 4A illustrates a pulse forming network having a resistance which is less than the impedance of the load. Examples of the values of the inductors and capacitors in the pulse forming network are as shown in FIG. 4B. The internal resistances of the inductors represented by R1-R5 in FIG. 4A, are maintained as low as possible by use of copper strip inductors, for example, such as shown in FIG. 5.

Figures 5A, 5C:
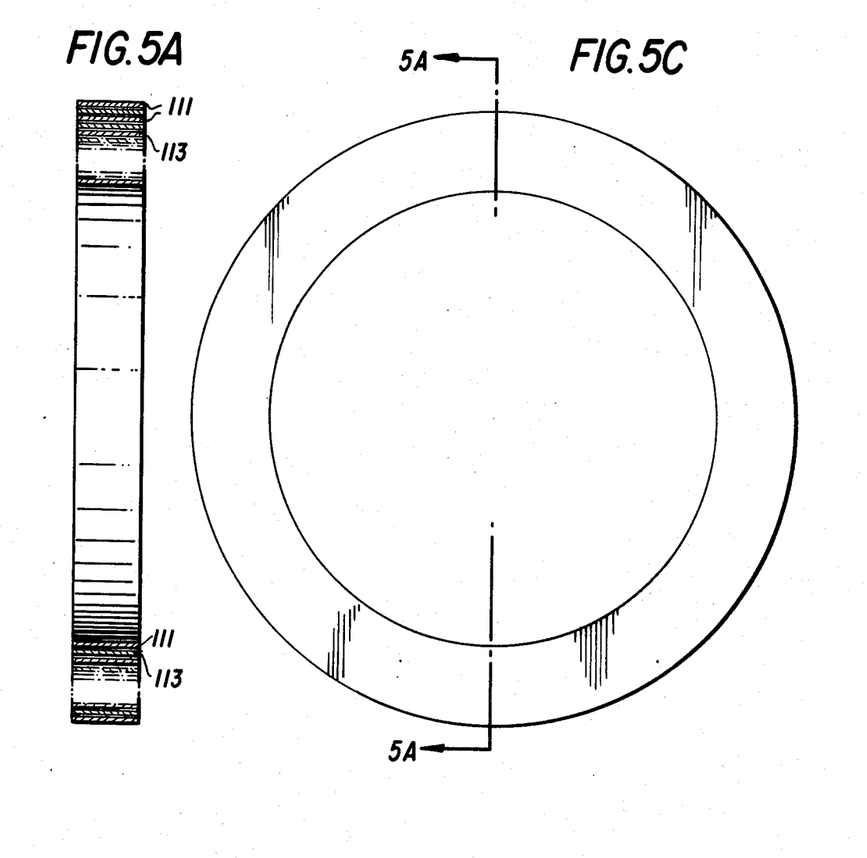
FIGS. 5A-5C illustrate a strip inductor of the present invention.
Figure 5B:
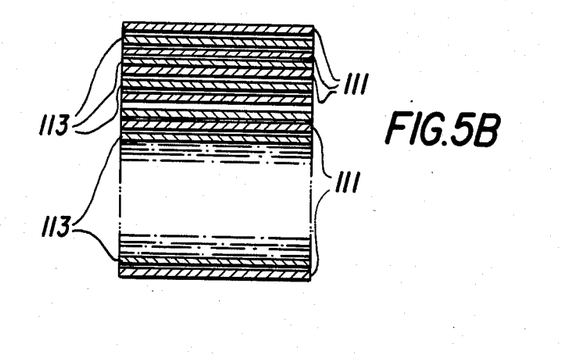

The inductors L1-L5 are formed from copper strips as shown in FIGS. 5A-5C. Each of the inductors are wound from copper strips 111 with mylar insulation strips 113 therebetween. The coils are wound in the form of a helix as shown in FIGS. 5A and C. FIG. 5B is an enlarged section of the coil layers. In one example, the copper strip has a thickness of 0.6 millimeters and a width of 40 millimeters. For a 50 $\mu$h inductor, 20 turns are necessary and the ohmic resistance of the inductor (at 20° C.) is 5 milliohms. The inductor coil has an inner diameter of 18 centimeters.

Figure 6:
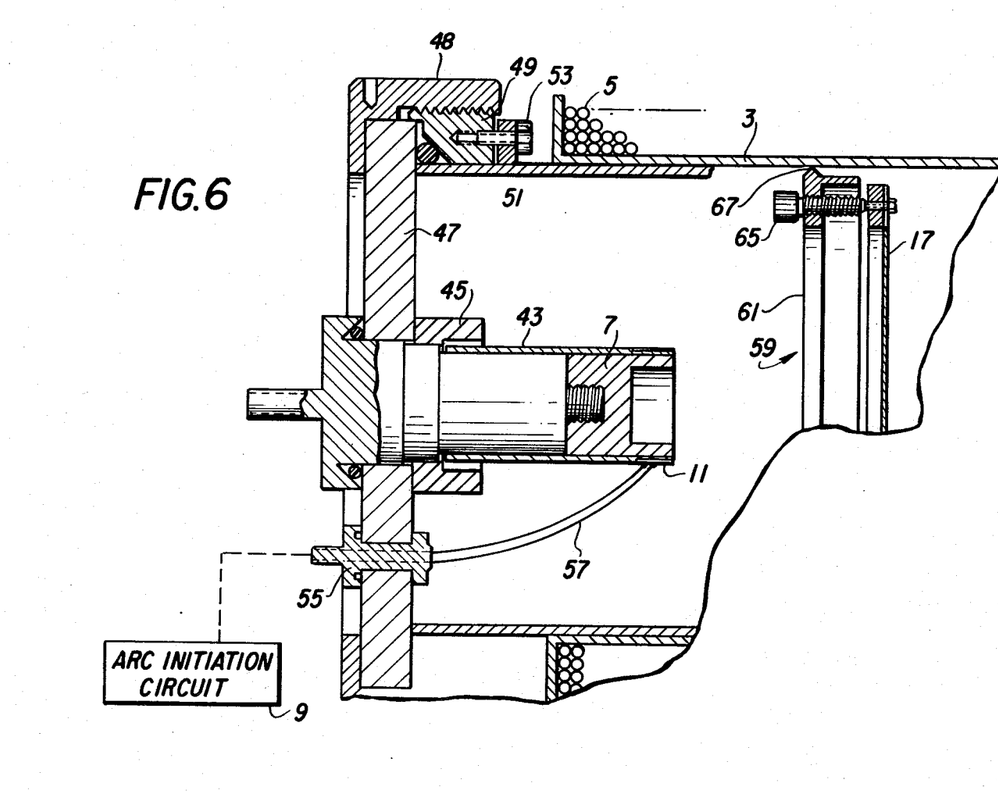
FIG. 6 is a partial sectional view of a cathode holder and anode grid holder of the present invention.
Figure 7:
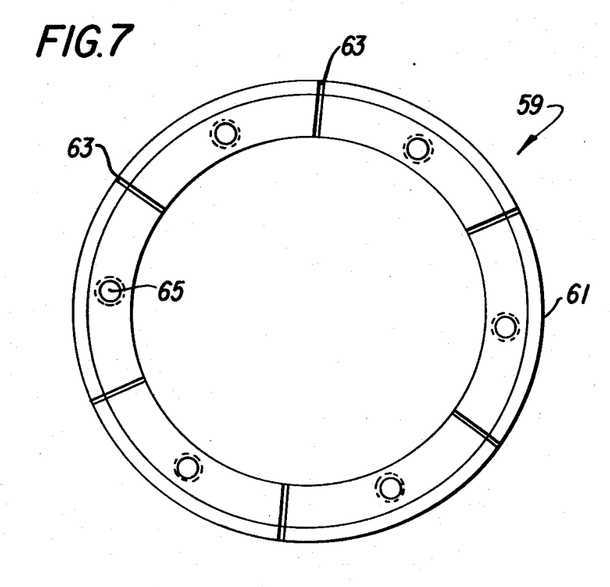
FIG. 7 is a view from the cathode side of the anode grid holder of the present invention.

FIGS. 6 and 7 illustrate the structure for connecting the arc initiation circuit to the cathode and the holder for the grid anode. The cathode 7 is fitted within a quartz tube 43 which is in turn held by a holder member 45. A plate 47 of a material such as lucite, has the holder 45 mounted therethrough and the plate 47 is connected to the vessel 3 by means of a release nut 48 and a threaded member 49 which is fixed to the vessel 3 by means of a flange 51 and bolt 53. A connector 55 passes through the plate 47 for connecting the arc circuit 9 to the trigger electrode 11 through connector 57.

The anode grid 17 is held in place by a grid holder 59 shown in FIGS. 6 and 7. The grid holder holds the grid 17 within the vessel 3 of the plasma centrifuge. The grid holder comprises a ring 61 having a knife edge 67 at its largest diameter which is approximately equal to the inner diameter of the vessel 3. The ring 61 has a plurality of radial slits 63 distributed around the ring. The tightening of the bolts 65 causes a deformation of the ring in such a way that the diameter increases at certain points causing the knife edge 67 to "bite into" the inner surface of the vessel 3.

The grid 17 is used to stabilize the vacuum arc and to prevent the initiation of the arc in a backwards direction as a sliding spark along the cathode holder. During the early stage of the arc, while the plasma density is low, the grid serves as an anode because of the large Debye length in the plasma as compared to the diameter of holes in the grid, and the grid appears to the discharge as a solid plate. In the steady state phase of the vacuum arc, the plasma density is high and the Debye length is short and thus, the grid behaves as a Langmuir probe collecting only a small current in comparison to the arc current.

Figure 8:
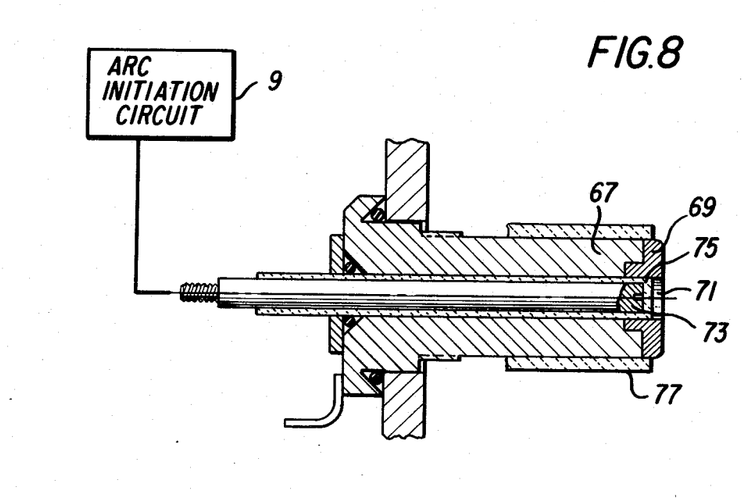
FIG. 8 is an alternative embodiment of a cathode, cathode holder and trigger electrode of the presesnt invention.

FIG. 8 illustrates an alternative embodiment of the cathode and electrode structure of the present invention. In FIG. 8, the cathode has a body 67, a portion of which 69 is formed from the material which forms the plasma which is the material to be separated. The body 67 and portion 69 have an axial hole 71 which extends therethrough. The electrode 73 is coaxial with the body 67 and is positioned in the hole 71. A quartz insulator 75 insulates the electrode from the cathode. A layer of insulating material 77, such as quartz, surrounds the electrode body 67. In the embodiment of FIG. 8, the cathode is held in the vessel in the same manner as the embodiment shown in FIG. 6.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for producing a vacuum arc in a plasma centrifuge, said apparatus comprising:

(a) a cathode means comprising a material from which said vacuum arc is formed;
(b) trigger electrode means;
(c) triggering circuit means coupled to said trigger electrode means for storing energy and then applying a break down voltage between said cathode means and said trigger electrode means wherein said cathode means breaks down and initiates said vacuum arc; and
(d) pulse forming means electrically coupled to said cathode means for supplying a constant current pulse to said cathode means to enhance the complete ionization of said vacuum arc, wherein the total ohmic resistance of the pulse forming means is lower than the impedance of the vacuum arc.

2. An apparatus as set forth in claim 1, wherein said triggering circuit means comprises:
(a) a power supply means;
(b) a capacitor connected to said power supply means;
(c) a pulse transformer, having a primary and a secondary, said capacitor being connected across said primary;
(d) intermittently operated switch means connected between said capacitor and said primary for intermittently connecting said capacitor and said primary; and
(e) spark gap means having one electrode connected to secondary of said pulse transformer and a second electrode connected to said power supply means.

3. An apparatus as set forth in claim 2, wherein said second electrode of said spark gap means is coupled to said cathode through a capacitor means, wherein a breakdown across said spark gap means produces a high voltage on said capacitor means which results in a breakdown between said trigger electrode and said cathode, thereby initiating said vacuum arc.

4. An apparatus as set forth in claim 2, wherein said switch means is a cam operated switch.

5. An apparatus as set forth in claim 1, including cathode holder means, said cathode holder means comprising:

(a) tubular means, said cathode means being inserted in said tubular means and said trigger electrode means being mounted on said tubular means;
(b) plate means having said tubular means mounted therethrough;
(c) fixing means for fixing said plate means to a vessel of said plasma centrifuge; and
(d) connector means passing through said plate means and coupled to said trigger electrode means, wherein said pulse forming means is connected to said connector means.

6. An apparatus as set forth in any one of claims 1–5, wherein said trigger electrode means is a ring formed around said cathode means.

7. An apparatus as set forth in any one of claims 1–4, wherein said cathode means comprises:
(a) a body having an axial hole through the center thereof, wherein at least a portion of said body is formed from the material from which the plasma is formed, and wherein said trigger electrode means extends through said hole; and
(b) insulator means in said hole between said body and said trigger electrode means.

8. An apparatus as set forth in claim 7, wherein said portion of said body circumferentially surrounds said trigger electrode means.

9. An apparatus as set forth in claim 1, including an anode grid means in said plasma centrifuge, said anode grid means comprising an annular ring member having an outer edge for engaging the inner wall of a vessel of the plasma centrifuge, and an anode mesh mounted on said ring member.

10. An apparatus as set forth in claim 9, including bolts for mounting said anode mesh on said ring member and wherein said ring member has a plurality of radial slits formed therein, whereby the tightening of said bolts causes the deformation of said ring such that said outer edge tightly engages the inner wall of said vessel.

11. An apparatus as set forth in claim 1, wherein said pulse forming means comprises a Guillemin network having a plurality of inductors and capacitors, wherein each inductor comprises a coiled conductive strip, the width of said strip being larger than the thickness thereof, and insulator means between adjacent conductive layers of the coiled strip.

* * * * *